United States Patent
Kato et al.

(10) Patent No.: US 7,082,090 B2
(45) Date of Patent: Jul. 25, 2006

(54) METHOD OF RECORDING INFORMATION TO AN OPTICAL RECORDING MEDIUM, INFORMATION RECORDING APPARATUS, AND OPTICAL RECORDING MEDIUM

(75) Inventors: Tatsuya Kato, Tokyo (JP); Hiroshi Shingai, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 291 days.

(21) Appl. No.: 10/488,981

(22) PCT Filed: Sep. 5, 2002

(86) PCT No.: PCT/JP02/09074
§ 371 (c)(1),
(2), (4) Date: Mar. 9, 2004

(87) PCT Pub. No.: WO03/023771
PCT Pub. Date: Mar. 20, 2003

(65) Prior Publication Data
US 2004/0246860 A1    Dec. 9, 2004

(30) Foreign Application Priority Data
Sep. 10, 2001  (JP) .............................. 2001-273874

(51) Int. Cl.
*G11B 5/09* (2006.01)
*G11B 7/00* (2006.01)
(52) U.S. Cl. ................. 369/59.11; 369/59.1; 369/47.5; 369/116; 369/275.1
(58) Field of Classification Search ..................... None
See application file for complete search history.

(56) References Cited

U.S. PATENT DOCUMENTS

| | | | | |
|---|---|---|---|---|
| 5,502,702 | A | * | 3/1996 | Nakajo ..................... 369/53.22 |
| 2002/0001275 | A1 | * | 1/2002 | Tanaka et al. ........... 369/59.12 |
| 2004/0165507 | A1 | * | 8/2004 | Gushima et al. ......... 369/59.11 |

FOREIGN PATENT DOCUMENTS

| | | |
|---|---|---|
| JP | 6203383 | 7/1994 |
| JP | 9134525 | 5/1997 |
| JP | 10083573 | 3/1998 |
| JP | 2001-331936 | 11/2001 |

\* cited by examiner

*Primary Examiner*—Muhammad Edun
(74) *Attorney, Agent, or Firm*—Seed IP Law Group PLLC (57) ABSTRACT

It is an object of the present invention to provide a method of recording information to an optical recording medium that is suited to achieving high data transfer rates.

The optical recording medium according to the present invention comprises a method of recording information to an optical recording medium where information is recorded by forming on the optical recording medium a plurality of recording marks selected from a group consisting of several types of recording marks with different lengths each corresponding to n times (n is a natural number) the clock frequency T, wherein: taking $T_r$ to be the transition time required for a laser beam to rise and $T_f$ to be the transition time required for the laser beam to fall, said recording marks are formed using a laser beam made up of a number of pulses given by $nT/(T_r+T_f)$ or less. Thus, even in the case that one clock period (T) is extremely short, the power level of the laser beam can reliably reach the maximum value ($P_w$) and minimum value ($P_b$), so it is possible to form recording marks with a good shape.

15 Claims, 10 Drawing Sheets

METHOD OF RECORDING INFORMATION TO AN OPTICAL RECORDING MEDIUM, INFORMATION RECORDING APPARATUS, AND OPTICAL RECORDING MEDIUM

BACKGROUND OF THE INVENTION

The present invention relates to a method of recording information to an optical recording medium and an information recording apparatus, and particularly to a method of recording information to an optical recording medium and an information recording apparatus that is suited to achieving high data transfer rates. In addition, the present invention relates to an optical recording medium and particularly to an optical recording medium that can be recorded at a high data transfer rate.

DESCRIPTION OF THE PRIOR ART

Optical recording media typified by the CD and the DVD and the like have been widely used as recording media for recording digital data, and a widely used data recording format is a format wherein the lengths of recording marks along the track are modulated depending on the data to be recorded.

When such a recording format is used, while reading data, a laser beam set to the playback power level is shined along the tracks of the optical recording medium and the reflected light is detected to read the information contained in the recording marks. In addition, while writing data, a laser beam set to the recording power level is shined along the tracks of the optical recording medium to form recording marks having the stipulated lengths. For example, in a DVD-RW which is one type of optical recording medium whose data is user-rewritable, recording marks of lengths corresponding to 3 T to 11T (where T is one clock cycle) are used to perform the recording of data.

Here, at the time of recording data to optical recording media, rather than illuminating the optical recording medium with a laser beam having the same pulse width as the time corresponding to the length of the recording marks, typically a laser beam consisting of a number of pulse trains determined based on the type of recording mark to be formed is shined onto the optical recording medium to form recording marks of the stipulated length. For example, when recording data onto a DVD-RW as described above, a number of pulses equal to n−1 or n−2 (where n is the type of recording mark, taking a value of either 3 to 11 or 14) is continuously shined, and thus one of the recording marks having a length corresponding to 3T to 11T or 14T is formed. Accordingly, in the case of n−2, one pulse is used to form a recording mark with a length corresponding to 3T, while nine pulses are used to form a recording mark with a length corresponding to 11 T. In addition, in the case of n−1, two pulses are used to form a recording mark with a length corresponding to 3 T, while ten pulses are used to form a recording mark with a length corresponding to 11 T.

In recent years, it has become strongly desirable to achieve further increases in the data transfer rate with respect to optical recording media and in order to achieve this, it is effective to increase the linear speed in recording/playback and to this end the clock frequency must be increased.

However, increasing the clock frequency makes the period of one clock pulse (T) shorter, so the time to form each recording mark decreases proportionally and when the laser beam is modulated to pulse trains as described above, the time equivalent to the width of each pulse making up the pulse train becomes very short.

On the other hand, the laser driver requires a certain amount of time from when the drive current is applied until the light emission intensity reaches the intensity corresponding to that current value. Accordingly, even if one attempts to shine the laser beam for an extremely short time in order to increase the data transfer rate, the laser beam intensity corresponding to each pulse will attenuate before reaching the stipulated value. In other words, a laser beam intensity corresponding closely to the pulse train pattern is not obtained. As a result, the recording layer on which recording marks are formed is inadequately heated so the shape of the recording marks may be distorted or small, or the output of the playback may be small or jitter may become large.

SUMMARY OF THE INVENTION

Accordingly, an object of the present invention is to provide an improved method of recording information to an optical recording medium and an improved information recording apparatus.

In addition, another object of the present invention is to provide a method of recording information to an optical recording medium and an information recording apparatus that are suited to achieving high data transfer rates.

In addition, another object of the present invention is to provide an optical recording medium that can be recorded at high data transfer rates.

In addition, a still other object of the present invention is to provide a method of recording information to an optical recording medium and an information recording apparatus that are suited to cases in which the clock period (T) is set shorter than the sum of the rise time and fall time of the laser beam.

These objects of the present invention are achieved by a method of recording information to an optical recording medium where information is recorded by forming on the optical recording medium a plurality of recording marks selected from a group consisting of several types of recording marks with different lengths each corresponding to n times (n is a natural number) the clock frequency T, wherein: taking $T_r$ to be the transition time required for a laser beam to rise and $T_f$ to be the transition time required for the laser beam to fall, said recording marks are formed using a laser beam made up of a number of pulses given by $nT/(T_r+T_f)$ or less.

With the present invention, the number of pulses in the laser beam is set to a number given by $nT/(T_r+T_f)$ or less, so even in the case that one clock period (T) is extremely short, the power level of the laser beam can reliably reach the maximum value ($P_w$) and minimum value ($P_b$), and thus a laser beam intensity corresponding accurately to the pulse train pattern can be obtained. Thereby, it is possible to form recording marks with a good shape.

In a preferred embodiment of the present invention, said recording marks are formed using a laser beam made up of a number of pulses given by $(n-0.5)T/(T_r+T_f)$.

In a further preferred embodiment of the present invention, said clock frequency T is shorter than the sum said transition times $T_r$ and $T_f$.

In a further preferred embodiment of the present invention, said recording marks are formed with the data transfer rate set to 70 Mbps or greater.

In a further preferred embodiment of the present invention, said recording marks are formed with the data transfer rate set to 200 Mbps or greater.

These objects of the present invention are also achieved by an information recording apparatus that records information by forming on the optical recording medium a plurality of recording marks selected from a group consisting of several types of recording marks with different lengths each corresponding to n times (n is a natural number) the clock frequency T, wherein: taking $T_r$ to be the transition time required for a laser beam to rise and $T_f$ to be the transition time required for the laser beam to fall, said recording marks are formed using a laser beam made up of a number of pulses given by $nT/(T_r+T_f)$ or less.

The objects of the present invention are also achieved by an optical recording medium on which information is recorded by forming on the optical recording medium a plurality of recording marks selected from a group consisting of several types of recording marks with different lengths each corresponding to n times (n is a natural number) the clock frequency T, wherein: taking $T_r$ to be the transition time required for a laser beam to rise and $T_f$ to be the transition time required for the laser beam to fall, said recording marks are formed using a laser beam made up of a number of pulses given by $nT/(T_r+T_f)$ or less.

In a preferred embodiment of the present invention, said recording marks are formed using a laser beam made up of a number of pulses given by $(n-0.5)T/(T_r+T_f)$.

DESCRIPTION OF THE PREFERRED EMBODIMENTS

Preferred embodiments of the present invention will be explained in detail with reference to the drawings.

Figure 1:
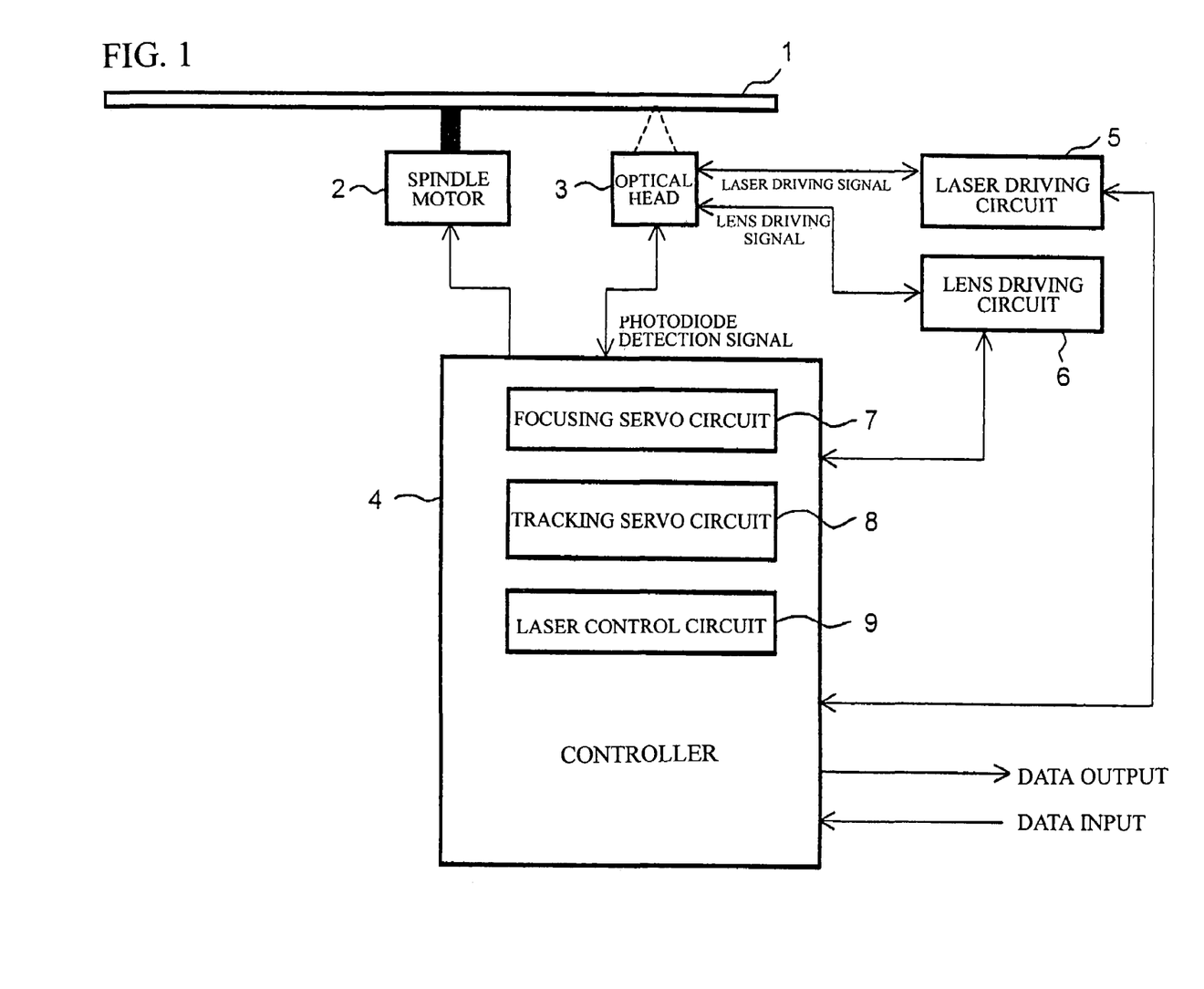
FIG. 1 is a schematic drawing of the major components of an information recording apparatus according to a preferred embodiment of the present invention.

FIG. 1 is a schematic drawing of the major components of an information recording apparatus according to a preferred embodiment of the present invention.

As shown in FIG. 1, the information recording apparatus according to this embodiment is equipped with a spindle motor 2 for rotating an optical recording medium 1, an optical head 3 for shining a laser beam onto the optical recording medium 1, a controller 4 for controlling the operation of the spindle motor 2 and the optical head 3, a laser driving circuit 5 that supplies a laser driving signal to the optical head 3, and a lens driving circuit 6 that supplies a lens driving signal to the optical head 3.

Moreover, as shown in FIG. 1, the controller 4 includes a focusing servo circuit 7, a tracking servo circuit 8, and a laser control circuit 9. When the focusing servo circuit 7 is activated, the focus is aligned to the recording surface of the rotating optical recording medium 1, and when the tracking servo circuit 8 is activated, the spot of the laser beam begins to automatically track the eccentric signal track of the optical recording medium 1. The focusing servo circuit 7 and tracking servo circuit 8 are provided with an auto gain control function for automatically adjusting the focusing gain and an auto gain control function for automatically adjusting the tracking gain, respectively. In addition, the laser control circuit 9 is a circuit that generates the laser driving signal supplied by the laser driving circuit 5, and generates an appropriate laser driving signal based on recording condition setting information recorded on the optical recording medium 1. Here, the "recording condition setting information" refers to various conditions required for recording data on the optical recording medium 1, e.g., information used in order to determine the power of the laser beam to be shined while recording, the pulse train pattern to be described later, and the like. The recording condition setting information may include not only various conditions required to record data indicated specifically, but also the recording conditions may be identified by specifying one of several conditions stored in advance within the information recording apparatus.

The focusing servo circuit 7, tracking servo circuit 8 and laser control circuit 9 need not be circuits incorporated in the controller 4 but can instead be components separate of the controller 4. Moreover, they need not be physical circuits but can instead be accomplished by software programs executed in the controller 4.

Here follows a description of the structure of an optical recording medium according to the present embodiment.

Figure 2:
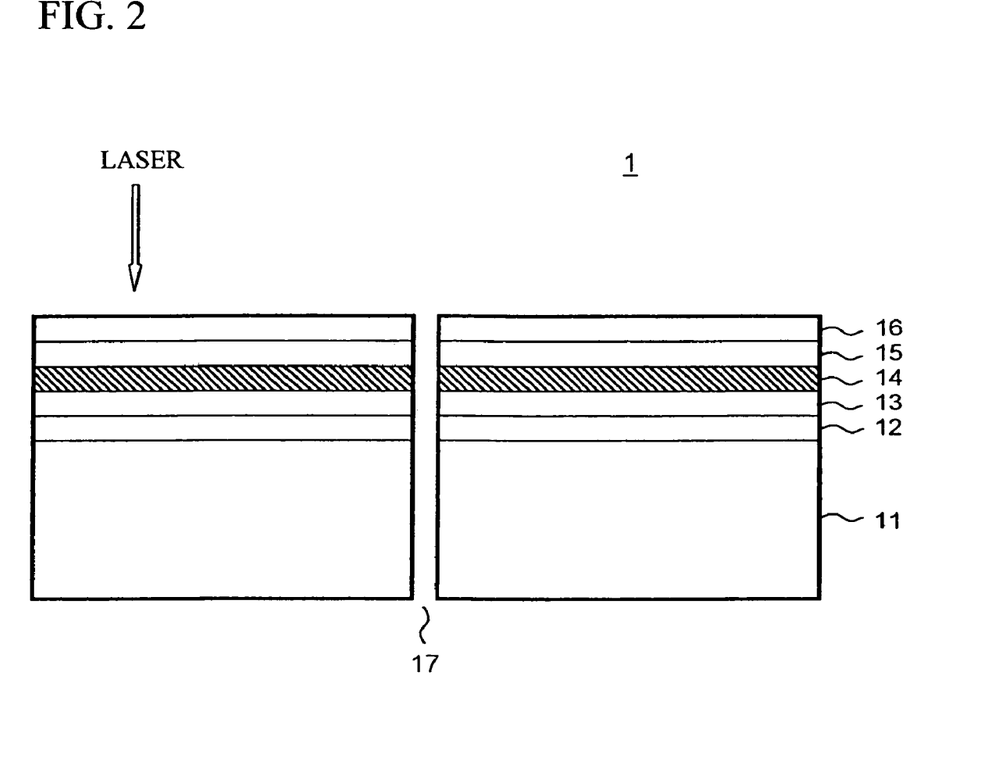
FIG. 2 is a schematic cross section of an optical recording medium 1 according to a preferred embodiment of the present invention.

FIG. 2 is a schematic cross section illustrating the structure of an optical recording medium 1 according to the present embodiment.

As shown in FIG. 2, the optical recording medium 1 consists of a substrate 11 with a thickness of approximately 1.1 mm, a reflective layer 12 with a thickness of approximately 10–300 nm, a second dielectric layer 13 with a thickness of approximately 10–50 nm, a recording layer 14 with a thickness of approximately 5–30 nm, a first dielectric layer 15 with a thickness of approximately 30–300 nm, and a light transmission layer 16 with a thickness of approximately 50–150 μm. In addition, a hole 17 is provided in the center of the optical recording medium 1. When recording data onto an optical recording medium with such a structure, the working distance (the distance between the objective lens used to focus the laser beam, which is a part of the optical head 3, and the surface of the optical recording medium 1) is set extremely short (e.g., approximately 80–150 μm), and thus a beam spot diameter much smaller than that in the past is achieved. With an optical recording medium 1 having such a structure, it is possible to achieve a high data capacity and a high data transfer rate. In addition, the recording condition setting information described above is recorded on the optical recording medium 1. The recording condition setting information may be recorded as a wobble signal or pre-pits, or it may be recorded as data in the recording layer 14.

The recording layer 14 of the optical recording medium 1 is made up of a phase-change film that has a different reflectance in the crystalline phase than in the amorphous phase, and this property is utilized to record data. Specifically, the unrecorded regions of the recording layer 14 are crystalline so their reflectance may be 20%, for example. To record some sort of data in such unrecorded regions, certain portions of the recording layer 14 depending on the data to be recorded are heated to a temperature in excess of the melting point and then rapidly cooled to change them into the amorphous state. The reflectance of the amorphous portions may become 7%, for example, assuming the state in which the stipulated data is recorded. Moreover, to overwrite data once it is recorded, the portions of the recording layer 14 that are recorded with data to be overwritten are heated to either above the crystallization temperature or above the melting point depending on the data to be recorded, thus changing it into the crystalline or amorphous state.

In this case, taking $P_w$ to be the write power level of the laser beam shined in order to melt the recording layer 14, $P_b$ to be the base power of the laser beam shined when cooling the recording layer 14 and $P_e$ to be the erase power of the laser beam shined when crystallizing the recording layer 14, they have the following relationship:

$$P_w > P_e > P_b.$$

Accordingly, when recording data to the optical recording medium 1, the controller 4 controls the laser driving circuit 5 via the laser control circuit 9 so that the power of the laser beam assumes the values $P_w$, $P_e$ and $P_b$ based on the recording condition setting information read from the optical recording medium 1, and the laser driving circuit 5 controls the power of the laser driving signal based thereupon. For example, the laser beam power levels $P_w$, $P_e$ and $P_b$ may be set to 6.0 mW, 2.8 mW and 0.1 mW, respectively.

Figure 3:
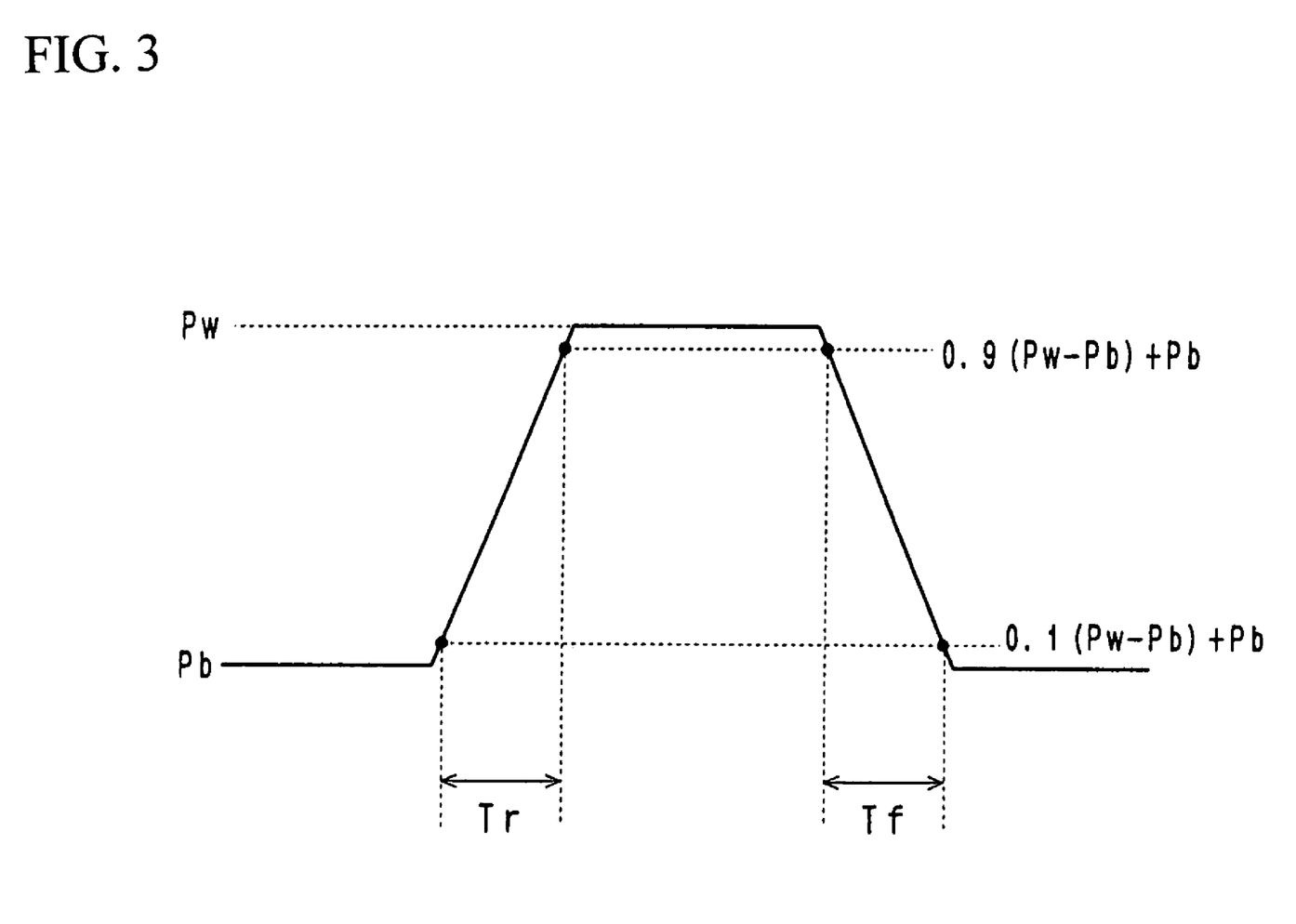
FIG. 3 is a drawing used to describe the definition of the transition times $T_r$ and $T_f$.

Here, a certain amount of time is required for the power of the laser beam to change from a certain value to a different value. In this specification, the transition time required for the laser beam power to rise from the minimum value ($P_b$) to the maximum value ($P_w$) is called $T_r$, while the transition time required for the laser beam power to fall from the maximum value ($P_w$) to the minimum value ($P_b$) is called $T_f$. More specifically, as shown in FIG. 3, the transition time $T_r$ is defined as the time from when the laser beam power reaches $0.1(P_w-P_b)+P_b$ until it reaches $0.9(P_w-P_b)+P_b$, while the transition time $T_b$ is defined as the time from when the laser beam power reaches $0.9(P_w-P_b)+P_b$ until it reaches $0.1(P_w-P_b)+P_b$.

In the information recording method according to this preferred embodiment, the (1,7) RLL modulation scheme is adopted. However, the application of the information recording method according to the present invention is not limited to the case in which this modulation scheme is used, but rather it is naturally applicable to cases in which another modulation scheme is used. Note that in this specification, the method of shining the laser beam in order to form a recording mark, namely the number of pulses in the laser beam, pulse width of each pulse, pulse interval, pulse power and other settings are collectively called the "pulse train pattern." Note that the pulse train pattern is also called the "recording strategy."

Here, in the information recording method according to the present embodiment, the number of pulses in the laser beam is set to a number given by $nT/(T_r+T_f)$ or less. Here follows a detailed description of the pulse train pattern for forming each of the recording marks in the case that T=~2.6 ns, $T_r$=~1.7 ns, and $T_f$=~1.9 ns. Note that in this case, the recording linear speed becomes ~32.6 m/s, the (1,7) RLL modulation scheme is used, the channel bit length is 0.13 µm, and the data transfer rate becomes ~200 Mbps taking into account a format efficiency of 80%. Note that in the laser drivers of typical optical pickup heads installed in current DVD drives and the like, the values of $T_r$ and $T_f$ are roughly ~3 ns, so the values of $T_r$ and $T_f$ given above in the present embodiment are the values in an extremely high speed laser driver used recently in an optical recording media evaluation apparatus or other apparatus used for research and development.

In addition, the recording condition setting information incorporated into the optical recording medium 1 contains content for determining which pulse train pattern should be used to record data, so the information recording apparatus shown in FIG. 1 performs the recording of data with the pulse train pattern to be described in detail below based on this determination.

Figure 4:
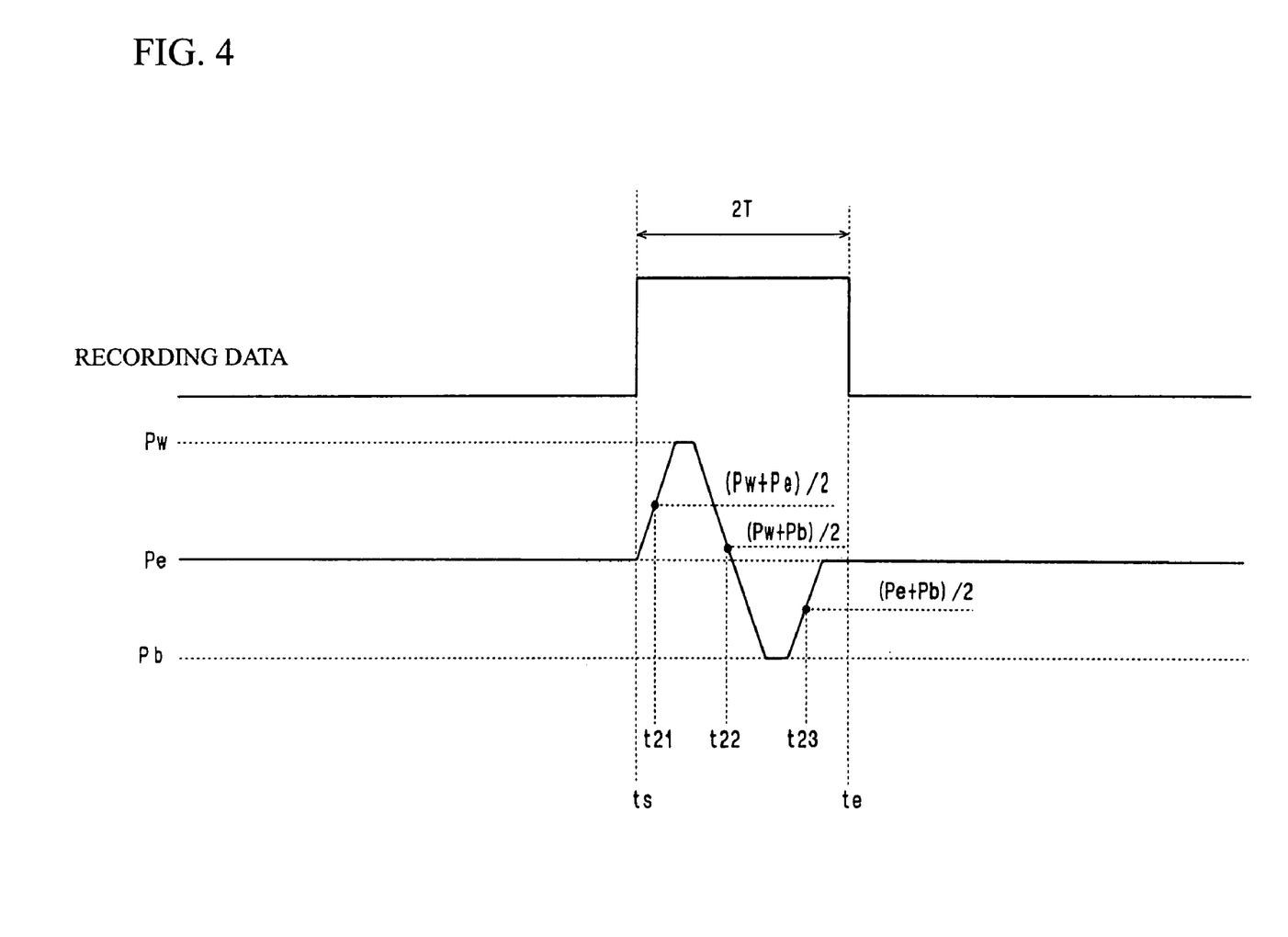
FIG. 4 is a drawing illustrating the pulse train pattern in the case of forming a recording mark of a length corresponding to 2T.

FIG. 4 is a drawing illustrating the pulse train pattern in the case of forming a recording mark of a length corresponding to 2T.

As shown in FIG. 4, when forming a recording mark of a length corresponding to 2T, the number given by $nT/(T_r+T_f)$ is ~1.4, so the number of pulses in the laser beam is set to 1. Here, the number of pulses in the laser beam is defined by the number of times the power of the laser beam shined during recording is raised to $P_w$. More specifically, taking the time $t_s$ to be the timing at which the laser beam is positioned at the starting point of the recording mark and the time $t_e$ to be the timing at which the laser beam is positioned at the ending point of the recording mark, during the period from the time $t_s$ to the time $t_e$, the laser beam power is first set to $P_w$ and then set to the power $P_b$. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{21}$ to time $t_{22}$ shown on FIG. 4 is defined to be $T_{top(2T)}$ and the interval from time $t_{22}$ to time $t_{23}$ is defined to be $T_{cl(2T)}$, $T_{top(2T)}$ is set to ~0.6T and $T_{cl(2T)}$ is set to ~0.7T. As shown in FIG. 4, the time $t_{21}$ is the timing at which the laser beam power exceeds $(P_w+P_e)/2$, the time $t_{22}$ is the timing at which the laser beam power drops below $(P_w+P_b)/2$, and the time $t_{23}$ is the timing at which the laser beam power exceeds $(P_e+P_b)/2$.

During the interval $T_{top(2T)}$, the recording layer 14 of the optical recording medium 1 receives a large amount of energy and its temperature exceeds the melting point, and during the interval $T_{cl(2T)}$, the recording layer 14 of the optical recording medium 1 is rapidly cooled. Thereby, a recording mark of a length corresponding to 2T is formed in the recording layer 14 of the optical recording medium 1.

Figure 5:
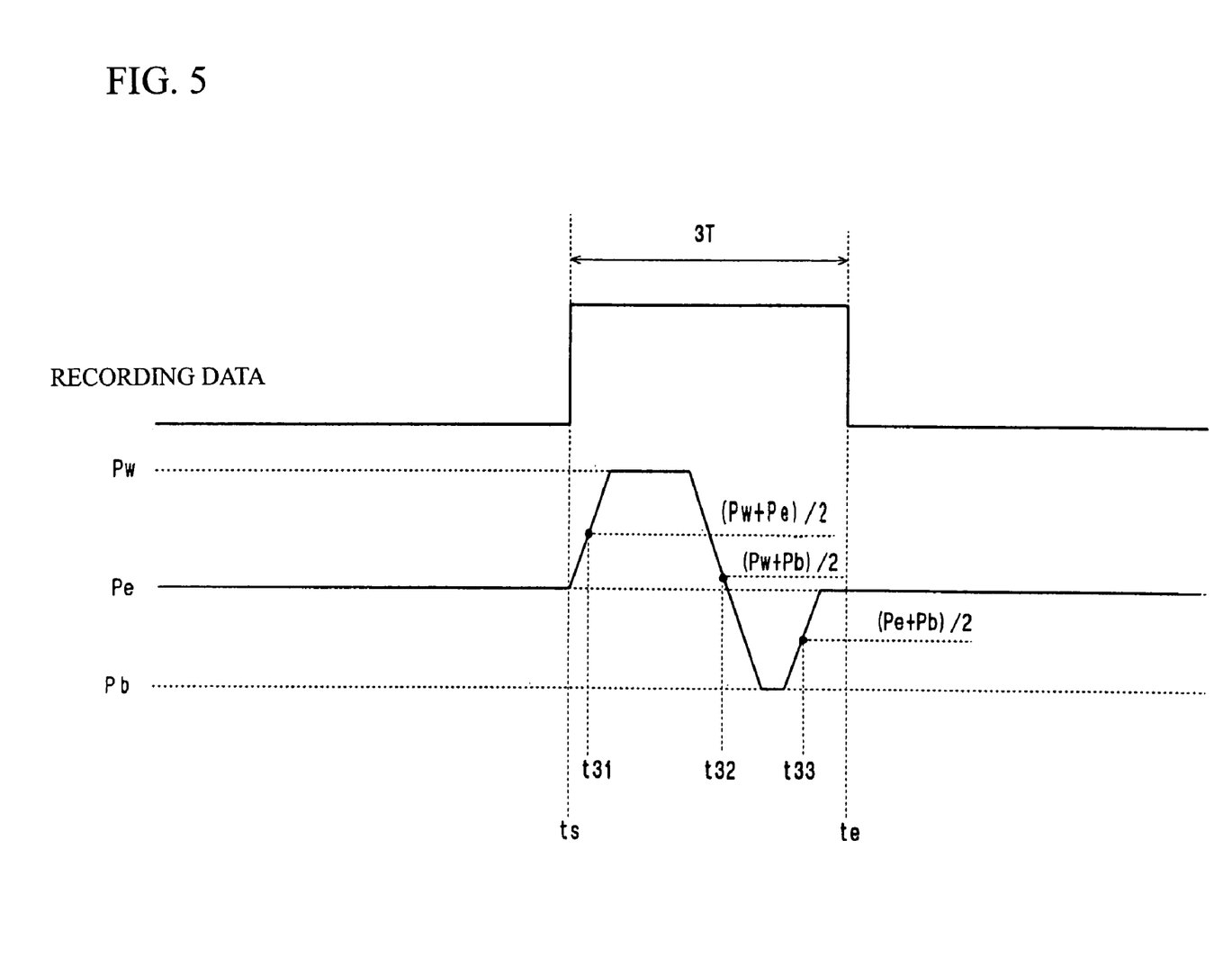
FIG. 5 is a drawing illustrating the pulse train pattern in the case of forming a recording mark of a length corresponding to 3 T.

FIG. 5 is a drawing illustrating the pulse train pattern in the case of forming a recording mark of a length corresponding to 3T.

As shown in FIG. 5, when forming a recording mark of a length corresponding to 3T, the number given by $nT/(T_r+T_f)$ is ~2.2, so the number of pulses in the laser beam is set to 2 or less. As shown in FIG. 5, in the present embodiment, the number of pulses when forming a recording mark of a length corresponding to 3T is set to 1. More specifically, during the period from the time $t_s$ to the time $t_e$, the laser beam power is first set to $P_w$ and then set to the power $P_b$. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{31}$ to time $t_{32}$ shown on FIG. 5 is defined to be $T_{top(3T)}$ and the interval from time $t_{32}$ to time $t_{33}$ is defined to be $T_{cl(3T)}$, $T_{top(3T)}$ is set to ~1.3T and $T_{cl(3T)}$ is set to ~0.7T. As shown in FIG. 5, the time $t_{31}$ is the timing at which the laser beam power exceeds $(P_w+P_e)/2$, the time $t_{32}$ is the timing at which the laser beam power drops below $(P_w+P_b)/2$, and the time $t_{33}$ is the timing at which the laser beam power exceeds $(P_e+P_b)/2$.

During the interval $T_{top(3T)}$, the recording layer 14 of the optical recording medium 1 receives a large amount of energy and its temperature exceeds the melting point, and during the interval $T_{cl(3T)}$, the recording layer 14 of the optical recording medium 1 is rapidly cooled. Thereby, a recording mark of a length corresponding to 3T is formed in the recording layer 14 of the optical recording medium 1.

Figure 6:
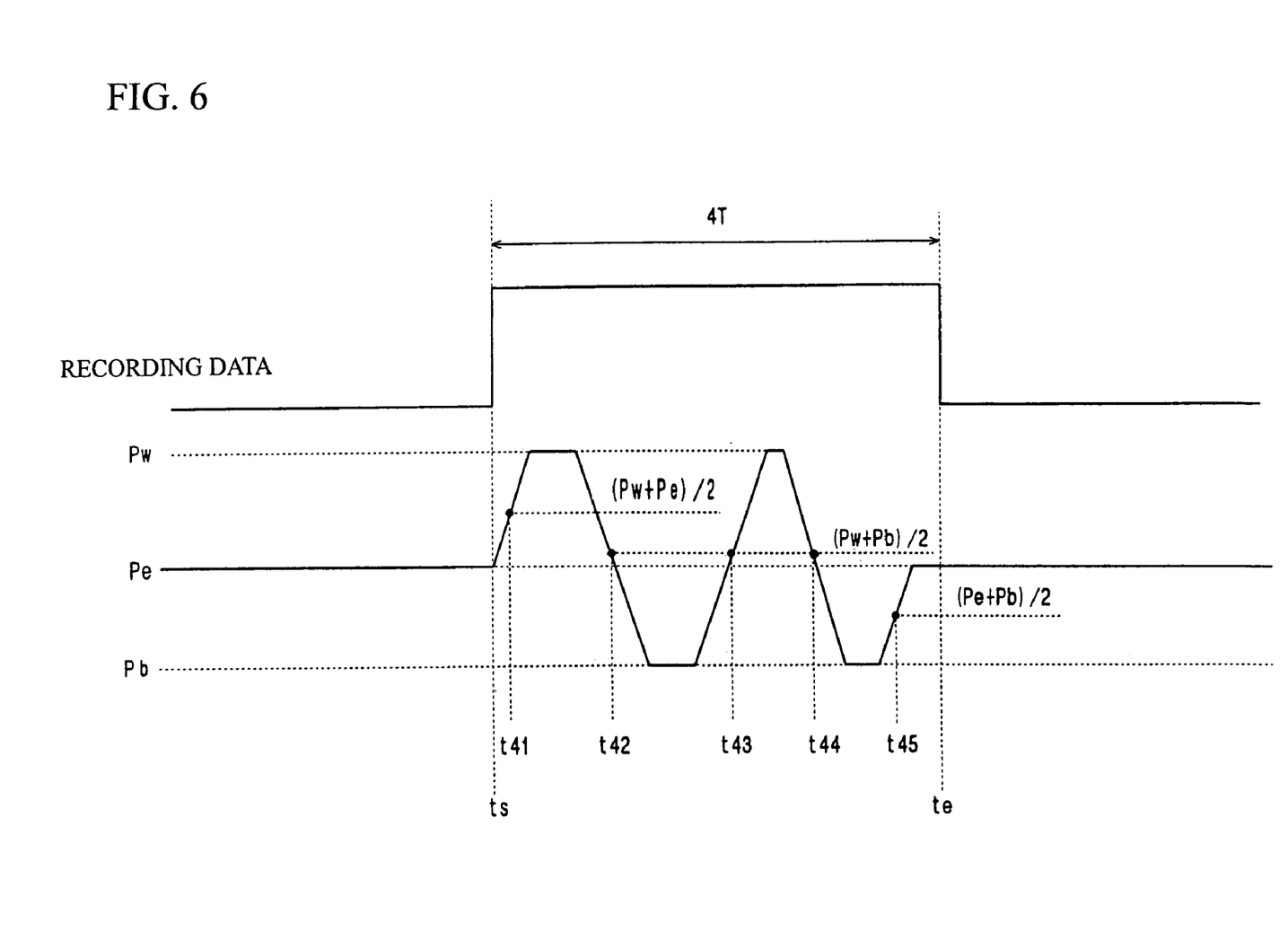
FIG. 6 is a drawing illustrating the pulse train pattern in the case of forming a recording mark of a length corresponding to 4T.

FIG. 6 is a drawing illustrating the pulse train pattern in the case of forming a recording mark of a length corresponding to 4T.

As shown in FIG. 6, when forming a recording mark of a length corresponding to 4T, the number given by $nT/(T_r+T_f)$ is ~2.9, so the number of pulses in the laser beam is set to 2 or less. As shown in FIG. 6, in the present embodiment, the number of pulses when forming a recording mark of a length corresponding to 4T is set to 1. During the period from the time $t_s$ to the time $t_e$, the laser beam power is first set to $P_w$ and then set to the power $P_b$. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{41}$ to time $t_{42}$ shown on FIG. 6 is defined to be $T_{top(4T)}$, the interval from time $t_{42}$ to time $t_{43}$ is defined to be $T_{off(4T)}$, the interval from time $t_{43}$ to time $t_{44}$ is defined to be $T_{last(4T)}$, and the interval from time $t_{44}$ to time $t_{45}$ is defined to be $T_{cl(4T)}$, $T_{top(4T)}$ is set to ~1.0T, $T_{off(4T)}$ is set to ~1.0, $T_{last(4T)}$ is set to ~0.7T, and $T_{cl(4T)}$ is set to ~0.7T. As shown in FIG. 6, the time $t_{41}$ is the timing at which the laser beam power exceeds $(P_w+P_e)/2$, the times $t_{42}$ and $t_{44}$ are the timing at which the laser beam power drops below $(P_w+P_b)/2$, the time $t_{43}$ is the timing at which the laser beam power exceeds $(P_w+P_b)/2$, and the time $t_{45}$ is the timing at which the laser beam power exceeds $(P_e+P_b)/2$.

During the intervals $T_{top(4T)}$, $T_{off(4T)}$, and $T_{last(4T)}$, the recording layer 14 of the optical recording medium 1 receives a large amount of energy and its temperature exceeds the melting point, and during the interval $T_{cl(4T)}$, the recording layer 14 of the optical recording medium 1 is rapidly cooled. Thereby, a recording mark of a length corresponding to 4T is formed in the recording layer 14 of the optical recording medium 1.

Figure 7:
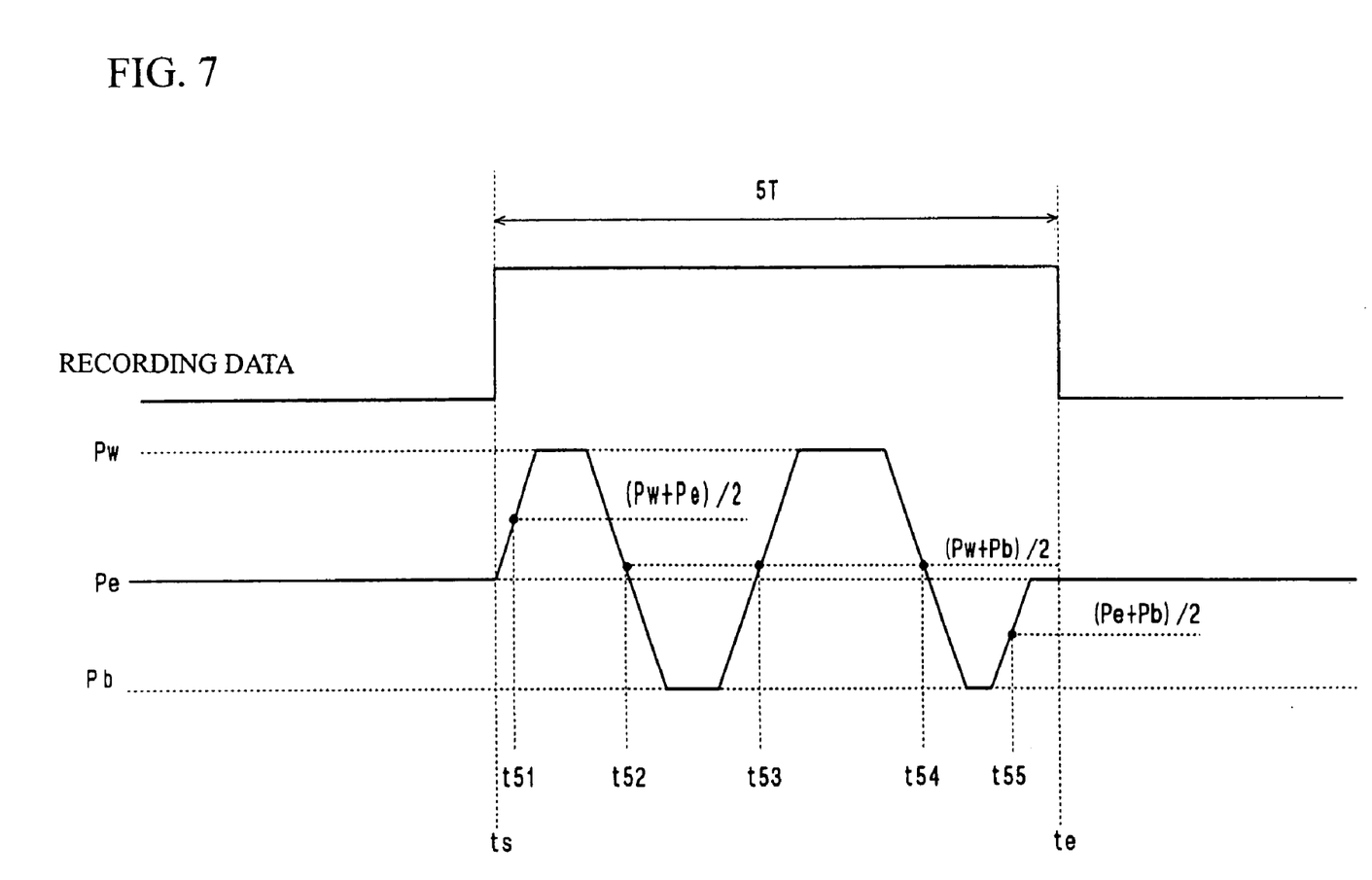
FIG. 7 is a drawing illustrating the pulse train pattern in the case of forming a recording mark of a length corresponding to 5 T.

FIG. 7 is a drawing illustrating the pulse train pattern in the case of forming a recording mark of a length corresponding to 5T.

As shown in FIG. 7, when forming a recording mark of a length corresponding to 5T, the number given by $nT/(T_r+T_f)$ is ~3.6, so the number of pulses in the laser beam is set to 3 or less. As shown in FIG. 7, in the present embodiment, the number of pulses when forming a recording mark of a length corresponding to 5T is set to 2. More specifically, during the period from the time $t_s$ to the time $t_e$, the set consisting of the combination of the laser beam power being first set to $P_w$ and then being set to the power $P_b$ is repeated twice. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{51}$ to time $t_{52}$ shown on FIG. 7 is defined to be $T_{top(5T)}$, the interval from time $t_{52}$ to time $t_{53}$ is defined to be $T_{off(5T)}$, the interval from time $t_{53}$ to time $t_{54}$ is defined to be $T_{last(5T)}$, and the interval from time $t_{54}$ to time $t_{55}$ is defined to be $T_{cl(5T)}$, $T_{top(5T)}$ is set to ~1.0T, $T_{off(5T)}$ is set to ~1.0T, $T_{last(5T)}$ is set to ~1.3T, and $T_{cl(5T)}$ is set to ~0.7T. As shown in FIG. 7, the time $t_{51}$ is the timing at which the laser beam power exceeds $(P_w+P_e)/2$, the times $t_{52}$ and $t_{54}$ are the timing at which the laser beam power drops below $(P_w+P_b)/2$, the time $t_{53}$ is the timing at which the laser beam power exceeds $(P_w+P_b)/2$, and the time $t_{55}$ is the timing at which the laser beam power exceeds $(P_e+P_b)/2$.

During the intervals $T_{top(5T)}$, $T_{off(5T)}$ and $T_{last(5T)}$, the recording layer 14 of the optical recording medium 1 receives a large amount of energy and its temperature exceeds the melting point, and during the interval $T_{cl(5T)}$, the recording layer 14 of the optical recording medium 1 is rapidly cooled. Thereby, a recording mark of a length corresponding to 5T is formed in the recording layer 14 of the optical recording medium 1.

Figure 8:
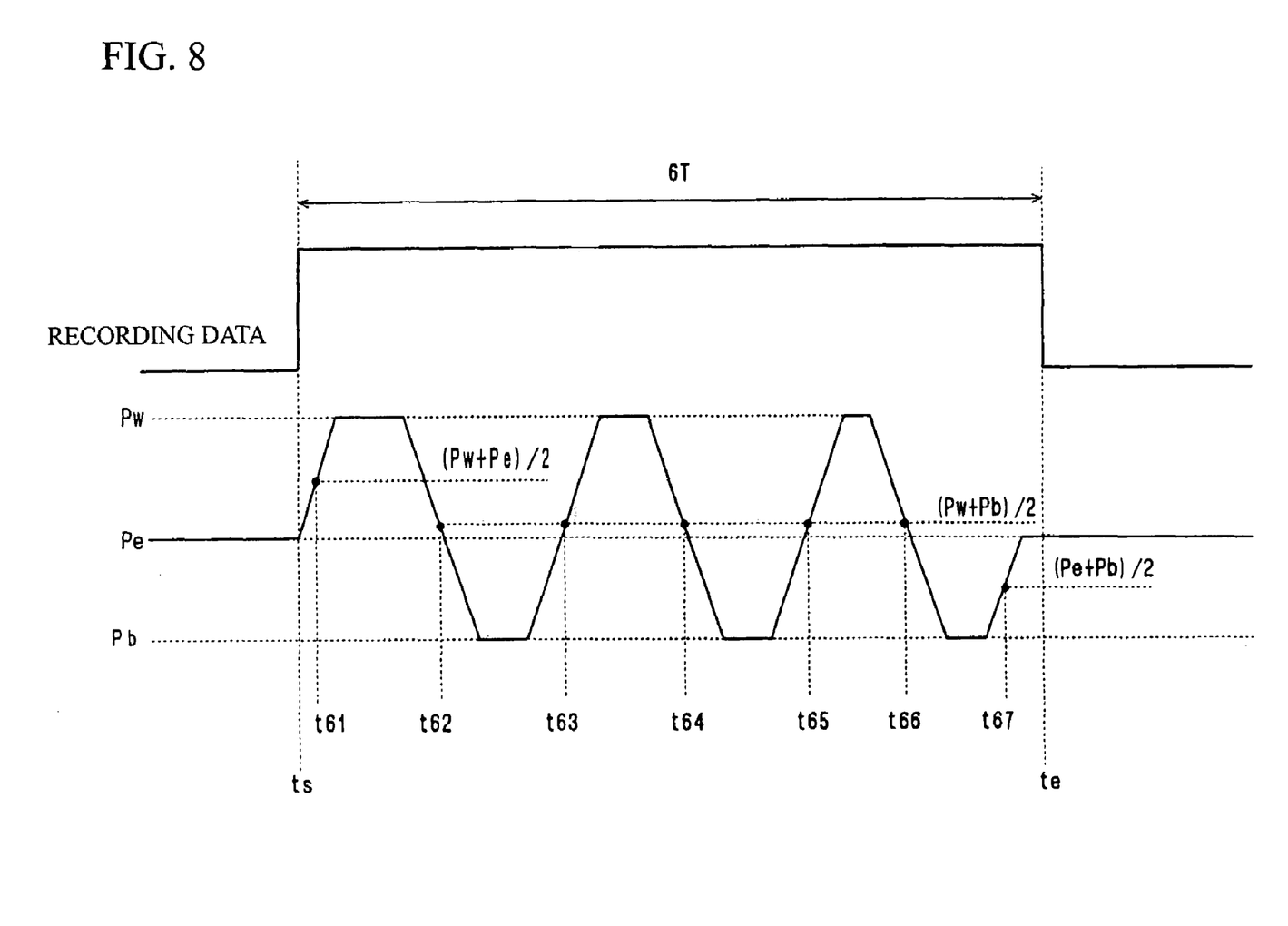
FIG. 8 is a drawing illustrating the pulse train pattern in the case of forming a recording mark of a length corresponding to 6T.

FIG. 8 is a drawing illustrating the pulse train pattern in the case of forming a recording mark of a length corresponding to 6T.

As shown in FIG. 8, when forming a recording mark of a length corresponding to 6T, the number given by $nT/(T_r+T_f)$ is ~4.3, so the number of pulses in the laser beam is set to 4 or less. As shown in FIG. 8, in the present embodiment, the number of pulses when forming a recording mark of a length corresponding to 6T is set to 3. More specifically, during the period from the time $t_s$ to the time $t_e$, the set consisting of the combination of the laser beam power being first set to $P_w$ and then being set to the power $P_b$ is repeated three times. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{61}$ to time $t_{62}$ shown on FIG. 8 is defined to be $T_{top(6T)}$, the interval from time $t_{62}$ to time $t_{63}$ is defined to be $T_{off(6T-1)}$, the interval from time $t_{63}$ to time $t_{64}$ is defined to be $T_{mp(6T)}$, the interval from time $t_{64}$ to time $t_{65}$ is defined to be $T_{off(6T-2)}$, the interval from time $t_{65}$ to time $t_{66}$ is defined to be $T_{last(6T)}$, and the interval from time $t_{66}$ to time $t_{67}$ is defined to be $T_{cl(6T)}$, $T_{top(6T)}$ is set to ~1.0T, $T_{off(6T-1)}$ is set to ~1.0T, $T_{mp(6T)}$ is set to ~1.0T, $T_{off(6T-2)}$ is set to ~1.0T, $T_{last(6T)}$ is set to ~0.7T, and $T_{cl(6T)}$ is set to ~0.7T. As shown in FIG. 8, the time $t_{61}$ is the timing at which the laser beam power exceeds $(P_w+P_e)/2$, the times $t_{62}$, $t_{64}$ and $t_{66}$ are the timing at which the laser beam power drops below $(P_w+P_b)/2$, the times $t_{63}$ and $t_{65}$ are the timing at which the laser beam power exceeds $(P_w+P_b)/2$, and the time $t_{67}$ is the timing at which the laser beam power exceeds $(P_e+P_b)/2$.

During the intervals $T_{top(6T)}$, $T_{off(6T-1)}$, $T_{mp(6T)}$, $T_{off(6T-2)}$ and $T_{last(6T)}$, the recording layer 14 of the optical recording medium 1 receives a large amount of energy and its temperature exceeds the melting point, and during the interval $T_{cl(6T)}$, the recording layer 14 of the optical recording medium 1 is rapidly cooled. Thereby, a recording mark of a length corresponding to 6T is formed in the recording layer 14 of the optical recording medium 1.

Figure 9:
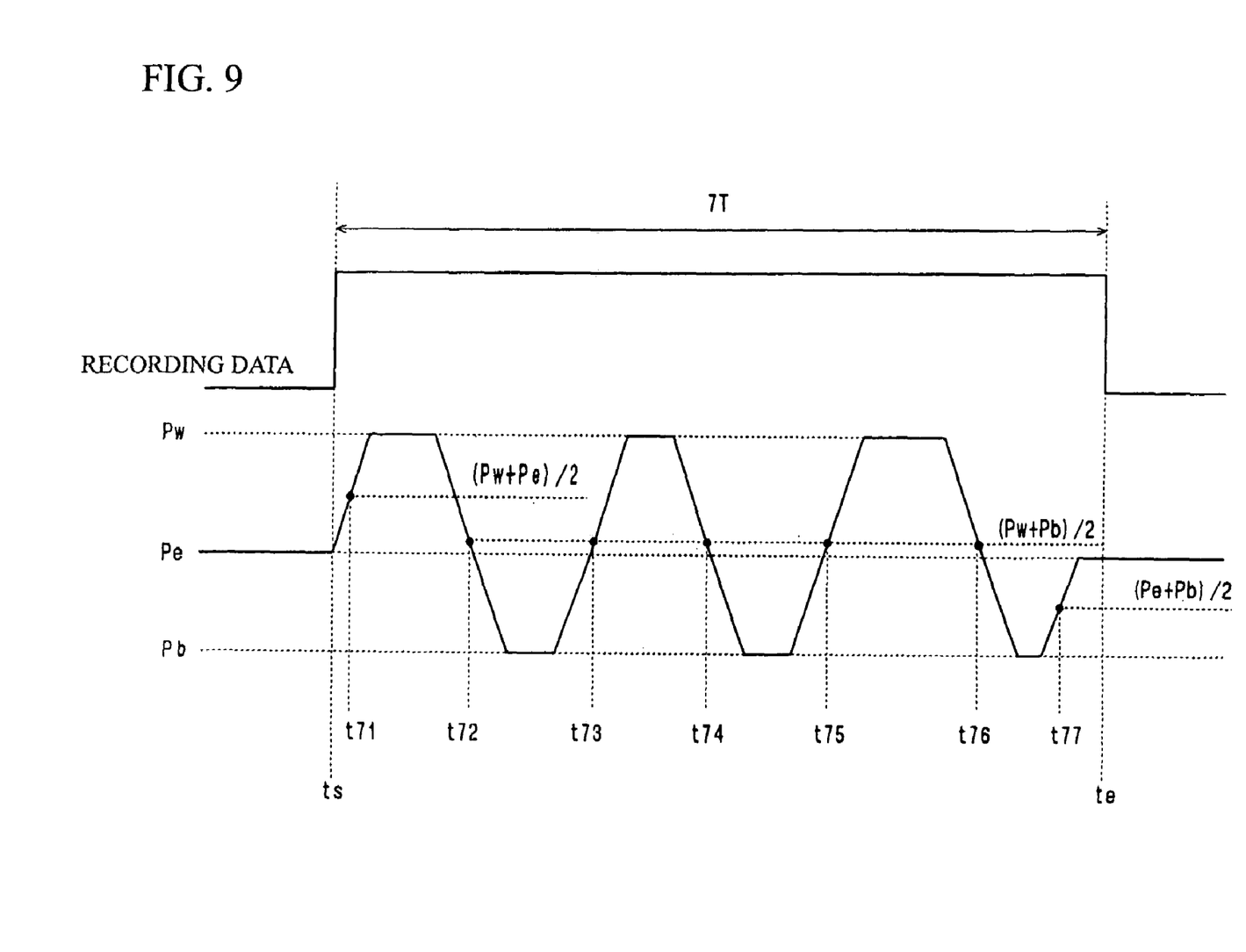
FIG. 9 is a drawing illustrating the pulse train pattern in the case of forming a recording mark of a length corresponding to 7T.

FIG. 9 is a drawing illustrating the pulse train pattern in the case of forming a recording mark of a length corresponding to 7T.

As shown in FIG. 9, when forming a recording mark of a length corresponding to 7T, the number given by $nT/(T_r+T_f)$ is ~5.1, so the number of pulses in the laser beam is set to 5 or less. As shown in FIG. 9, in the present embodiment, the number of pulses when forming a recording mark of a length corresponding to 7T is set to 3. More specifically, during the period from the time $t_s$ to the time $t_e$, the set consisting of the combination of the laser beam power being first set to $P_w$ and then being set to the power $P_b$ is repeated three times. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{71}$ to time $t_{72}$ shown on FIG. 9 is defined to be $T_{top(7T)}$, the interval from time $t_{72}$ to time $t_{73}$ is defined to be $T_{off(7T-1)}$, the interval from time $t_{73}$ to time $t_{74}$ is defined to be $T_{mp(7T)}$, the interval from time $t_{74}$ to time $t_{75}$ is defined to be $T_{off(7T-2)}$, the interval from time $t_{75}$ to time $t_{76}$ is defined to be $T_{last(7T)}$, and the interval from time $t_{76}$ to time $t_{77}$ is defined to be $T_{cl(7T)}$, $T_{top(7T)}$ is set to ~1.0T, $T_{off(7T-1)}$ is set to ~1.0T, $T_{mp(7T)}$ is set to ~1.0T, $T_{off(7T-2)}$ is set to ~1.0T, $T_{last(7T)}$ is set to ~1.3T, and $T_{cl(7T)}$ is set to ~0.7T. As shown in FIG. 9, the time $t_{71}$ is the timing at which the laser beam power exceeds $(P_w+P_e)/2$, the times $t_{72}$, $t_{74}$ and $t_{76}$ are the timing at which the laser beam power drops below $(P_w+P_b)/2$, the times $t_{73}$ and $t_{75}$ are the timing at which the laser beam power exceeds $(P_w+P_b)/2$, and the time $t_{77}$ is the timing at which the laser beam power exceeds $(P_e+P_b)/2$.

During the intervals $T_{top(7T)}$, $T_{off(7T-1)}$, $T_{mp(7T)}$, $T_{off(7T-2)}$, and $T_{last(7T)}$, the recording layer 14 of the optical recording medium 1 receives a large amount of energy and its temperature exceeds the melting point, and during the interval $T_{cl(7T)}$, the recording layer 14 of the optical recording medium 1 is rapidly cooled. Thereby, a recording mark of a length corresponding to 7T is formed in the recording layer 14 of the optical recording medium 1.

Figure 10:
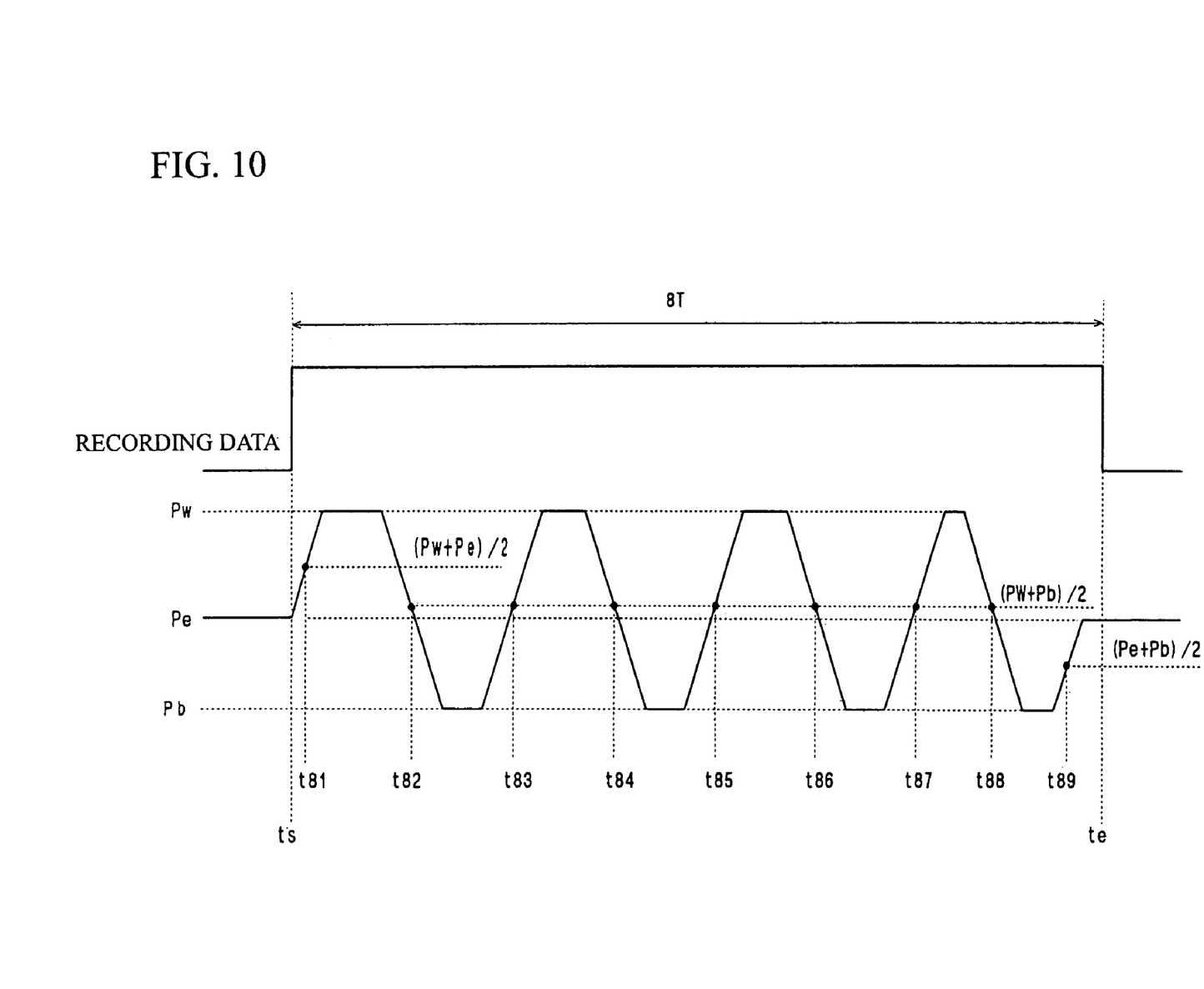
FIG. 10 is a drawing illustrating the pulse train pattern in the case of forming a recording mark of a length corresponding to 8T.

FIG. 10 is a drawing illustrating the pulse train pattern in the case of forming a recording mark of a length corresponding to 8T.

As shown in FIG. 10, when forming a recording mark of a length corresponding to 8T, the number given by $nT/(T_r+T_f)$ is ~5.8, so the number of pulses in the laser beam is set to 5 or less. As shown in FIG. 10, in the present embodiment, the number of pulses when forming a recording mark of a length corresponding to 8T is set to 4. More specifically, during the period from the time $t_s$ to the time $t_e$, the set consisting of the combination of the laser beam power being first set to $P_w$ and then being set to the power $P_b$ is repeated four times. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{81}$ to time $t_{82}$ shown on FIG. 10 is defined to be $T_{top(8T)}$ the interval from time $t_{82}$ to time $t_{83}$ is defined to be $T_{off(8T-1)}$, the interval from time $t_{83}$ to time $t_{84}$ is defined to be $T_{mp(8T-1)}$, the interval from time $t_{84}$ to time $t_{85}$ is defined to be $T_{off(8T-2)}$, the interval from time $t_{85}$ to time $t_{86}$ is defined to be $T_{mp(8T-2)}$, the interval from time $t_{86}$ to time $t_{87}$ is defined to be $T_{off(8T-3)}$, the interval from time $t_{87}$ to time $t_{88}$ is defined to be $T_{last(8T)}$, and the interval from time $t_{88}$ to time $t_{89}$ is defined to be $T_{cl(8T)}$, $T_{top(8T)}$ is set to ~1.0T, $T_{off(8T-1)}$ is set to ~1.0T, $T_{mp(8T-1)}$ is set to ~1.0T, $T_{off(8T-2)}$ is set to ~1.0T, $T_{mp(8T-2)}$ is set to ~1.0T, $T_{off(8T-3)}$ is set to ~1.0T, $T_{last(8T)}$ is set to ~0.7T, and $T_{cl(8T)}$ is set to ~0.7T. As shown in FIG. 10, the time $t_{81}$ is the timing at which the laser beam power exceeds $(P_w+P_e)/2$, the times $t_{82}$, $t_{84}$, $t_{86}$ and $t_{88}$ are the timing at which the laser beam power drops below $(P_w+P_b)/2$, the times $t_{83}$, $t_{85}$ and $t_{87}$ are the timing at which the laser beam power exceeds $(P_w+P_b)/2$, and the time $t_{89}$ is the timing at which the laser beam power exceeds $(P_e+P_b)/2$.

During the intervals $T_{top(8T)}$, $T_{off(8T-1)}$, $T_{mp(8T-1)}$, $T_{off(8T-2)}$, $T_{mp(8T-2)}$, $T_{off(8T-3)}$, and $T_{last(8T)}$, the recording layer 14 of the optical recording medium 1 receives a large amount of energy and its temperature exceeds the melting point, and during the interval $T_{cl(8T)}$, the recording layer 14 of the optical recording medium 1 is rapidly cooled. Thereby, a recording mark of a length corresponding to 8T is formed in the recording layer 14 of the optical recording medium 1.

In this manner, with the present embodiment, the number of pulses in the laser beam is set to a number given by $nT/(T_r+T_f)$ or less, so even in the case that one clock period (T) is extremely short, the power level of the laser beam can reliably reach the maximum value $(P_w)$ and minimum value $(P_b)$, and thus a laser beam intensity corresponding accurately to the pulse train pattern can be obtained. Thus, it is possible to form recording marks with a good shape even in the case in which the clock period (T) is set shorter than the sum of the rise time and fall time of the laser beam. Accordingly, with the present embodiment, even if the recording linear speed of the laser beam is set to ~32.6 m/s and the clock frequency is set to ~375 MHz (T=~2.6 ns) so that the data transfer rate becomes ~200 Mbps, it is still possible to form recording marks with a good shape.

In addition, the present embodiment describes a pulse train pattern in the case of using a laser driver wherein $T_r$=~1.7 ns and $T_f$=~1.9 ns, but as described above, these values of $T_r$ and $T_f$ are values in a laser driver that is much faster than those in the laser drivers of typical optical pickup heads installed in current DVD drives and the like. Accordingly, the meritorious effects of the present invention are even more marked when used in a laser driver having a lower-speed rise time and fall time such as a typical laser driver wherein $T_r$ and $T_f$ may be ~3 ns, for example. In other words, when using a typical laser driver wherein $T_r$ and $T_f$ is ~3 ns, where it is difficult to achieve a data transfer rate of 70 Mbps or greater with the conventional pulse train pattern, with the present invention, it is possible to achieve data transfer rates of 70 Mbps or greater even when using such a typical laser driver.

The present invention is in no way limited to the aforementioned embodiment, but rather various modifications are possible within the scope of the invention as recited in the claims, and these are naturally included within the scope of the invention.

For example, in the preferred embodiment above, the number of pulses of the laser beam was set to 1, 1, 2, 2, 3, 3 and 4 when forming recording marks with lengths corresponding to 2T, 3T, 4T, 5T, 6T, 7T and 8T, respectively, but the pulse train pattern according to the present invention is not limited thereto, but rather a different pulse train pattern may be adopted as long as the number of pulses in the laser beam is a number given by $nT/(T_r+T_f)$ or less.

In addition, while the optical recording medium 1 shown in FIG. 2 is given as an example of a suitable optical recording medium for the application of the method of recording information to an optical recording medium according to the present embodiment, the information recording method according to the present invention is not limited in being applicable only to this optical recording medium, but rather it is applicable to any kind of optical recording medium as long as it is a recordable optical recording medium.

Moreover, in the aforementioned preferred embodiment, the power of the laser beam shined during recording is set to the three levels of $P_w$, $P_e$ and $P_b$, but it may also be set to two levels. For example, in the aforementioned preferred embodiment, the laser beam power $P_e$ is set higher than the laser beam power $P_b$, but they may also be set to the same power level. In addition, the power of the laser beam shined during recording may also be set to four or more levels.

In addition, in the aforementioned preferred embodiment, the number of pulses in the laser beam is set to a number given by $nT/(T_r+T_f)$ or less, but it may also be set to a number given by $(n-0.5)T/(T_r+T_f)$ or less as long as a number equal to 1 or more is given as the number of pulses required to form the shortest recording mark.

As described above, the present invention can provide a method of recording information to an optical recording medium and an information recording apparatus that is suited to achieving high data transfer rates. In particular, the present invention is more effective the higher the data transfer rate to be achieved, being effective in achieving data transfer rates of 70 Mbps or greater, and particularly effective in achieving data transfer rates of 200 Mbps or greater.

The invention claimed is:

1. A method of recording information to an optical recording medium where information is recorded by forming on the optical recording medium a plurality of recording marks selected from a group consisting of several types of recording marks with different lengths each corresponding to n times (n is a natural number) the clock frequency T, wherein: taking $T_r$ to be the transition time required for a laser beam to rise and $T_f$ to be the transition time required for the laser beam to fall, said recording marks are formed using a laser beam made up of a number of pulses given by $nT/(T_r+T_f)$ or less.

2. A method of recording information to an optical recording medium in accordance with claim 1, wherein said recording marks are formed using a laser beam made up of a number of pulses given by $(n-0.5)T/(T_r+T_f)$.

3. A method of recording information to an optical recording medium in accordance with claim 2, wherein said clock frequency T is shorter than the sum of said transition times $T_r$ and $T_f$.

4. A method of recording information to an optical recording medium in accordance with claim 3, wherein said recording marks are formed with the data transfer rate set to 70 Mbps or greater.

5. A method of recording information to an optical recording medium in accordance with claim 4, wherein said recording marks are formed with the data transfer rate set to 200 Mbps or greater.

6. A method of recording information to an optical recording medium in accordance with claim 2, wherein said recording marks are formed with the data transfer rate set to 70 Mbps or greater.

7. A method of recording information to an optical recording medium in accordance with claim 6, wherein said recording marks are formed with the data transfer rate set to 200 Mbps or greater.

8. A method of recording information to an optical recording medium in accordance with claim 1, wherein said clock frequency T is shorter than the sum of said transition times $T_r$ and $T_f$.

9. A method of recording information to an optical recording medium in accordance with claim 8, wherein said recording marks are formed with the data transfer rate set to 70 Mbps or greater.

10. A method of recording information to an optical recording medium in accordance with claim 9, wherein said recording marks are formed with the data transfer rate set to 200 Mbps or greater.

11. A method of recording information to an optical recording medium in accordance with claim 1, wherein said recording marks are formed with the data transfer rate set to 70 Mbps or greater.

12. A method of recording information to an optical recording medium in accordance with claim 11, wherein said recording marks are formed with the data transfer rate set to 200 Mbps or greater.

13. An information recording apparatus that records information by forming on the optical recording medium a plurality of recording marks selected from a group consisting of several types of recording marks with different lengths each corresponding to n times (n is a natural number) the clock frequency T, wherein: taking $T_r$ to be the transition time required for a laser beam to rise and $T_f$ to be the transition time required for the laser beam to fall, said recording marks are formed using a laser beam made up of a number of pulses given by $nT/(T_r+T_f)$ or less.

14. An optical recording medium on which information is recorded by forming on the optical recording medium a plurality of recording marks selected from a group consisting of several types of recording marks with different lengths each corresponding to n times (n is a natural number) the clock frequency T, wherein: taking $T_r$ to be the transition time required for a laser beam to rise and $T_f$ to be the transition time required for the laser beam to fall, said recording marks are formed using a laser beam made up of a number of pulses given by $nT/(T_r+T_f)$ or less.

15. An optical recording medium in accordance with claim 14, wherein said recording marks are formed using a laser beam made up of a number of pulses given by $(n-0.5)T/(T_r+T_f)$.

* * * * *